United States Patent
Muramatsu

(10) Patent No.: US 11,701,999 B2
(45) Date of Patent: *Jul. 18, 2023

(54) LIGHT EMITTING DEVICE

(71) Applicant: YAMAHA HATSUDOKI KABUSHIKI KAISHA, Iwata (JP)

(72) Inventor: Kenichi Muramatsu, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/865,997

(22) Filed: Jul. 15, 2022

(65) Prior Publication Data

US 2022/0348132 A1    Nov. 3, 2022

Related U.S. Application Data

(62) Division of application No. 17/203,915, filed on Mar. 17, 2021, now Pat. No. 11,420,551.

(30) Foreign Application Priority Data

Mar. 31, 2020    (JP) .................... 2020-065015

(51) Int. Cl.
  *B60Q 1/14*    (2006.01)
  *B62J 6/023*   (2020.01)

(52) U.S. Cl.
  CPC ........ *B60Q 1/143* (2013.01); *B60Q 2300/136* (2013.01); *B62J 6/023* (2020.02)

(58) Field of Classification Search
  CPC .............. B60Q 1/143; B60Q 2300/136; F21V 23/0485; H05B 45/357
  See application file for complete search history.

(56) References Cited

U.S. PATENT DOCUMENTS 11,420,551 B2 *    8/2022    Muramatsu ............ B60Q 1/143
2008/0259625 A1    10/2008   Noyori et al.
(Continued)

FOREIGN PATENT DOCUMENTS

CN    103496414 A    1/2014
EP    2641779 A2     9/2013
(Continued)

OTHER PUBLICATIONS

Valeo: "Lighting Systems From light to advanced vision technologies", Dec. 31, 2015(Dec. 31, 2015), XP055979916, Retrieved from the internet: URL:https://www.dalroad.com/wp-content/uploads/2015/06/lighting_systems_from_light_to_advanced_vision_technologies_technical_handbook_valeoscope_en_998542_web.pdf [retrieved on Nov. 10, 2022].

*Primary Examiner* — Abdullah A Riyami
*Assistant Examiner* — Syed M Kaiser
(74) *Attorney, Agent, or Firm* — Rabin & Berdo, P.C.

(57) ABSTRACT

A light emitting device for a leaning vehicle, including a pair of cornering lamps, including a first cornering lamp and a second cornering lamp, that emit light to form a single left-front light emission area and a single right-front light emission area, and a control device that controls light emission by the pair of cornering lamps based on a lean angle of the vehicle body. The control device is configured to cause a first quantity of light and a second quantity of light, which are respectively a quantity of light outputted from the at least one light source included in the first cornering lamp and in the second cornering lamp, respectively, to vary in accordance with the lean angle of the vehicle body, such that each of the single left-front light emission area and the single right-front light emission area becomes larger as the lean angle of the vehicle body increases.

12 Claims, 7 Drawing Sheets

(56) References Cited

U.S. PATENT DOCUMENTS

| | | | |
|---|---|---|---|
| 2013/0241414 A1* | 9/2013 | Ikeda | B62J 6/023 315/82 |
| 2015/0085514 A1 | 3/2015 | Yagi | |
| 2017/0182930 A1 | 6/2017 | Sakamoto et al. | |
| 2019/0366908 A1* | 12/2019 | Horn | B60Q 1/085 |
| 2019/0384054 A1 | 12/2019 | Mukojima | |

FOREIGN PATENT DOCUMENTS

| | | |
|---|---|---|
| EP | 2657078 A2 | 10/2013 |
| EP | 2669114 A2 | 12/2013 |
| EP | 2669162 A1 | 12/2013 |
| EP | 2792546 A1 | 10/2014 |
| EP | 2792585 A1 | 10/2014 |
| EP | 2641779 B1 | 6/2015 |
| EP | 3187398 A1 | 7/2017 |
| EP | 3187399 A1 | 7/2017 |
| EP | 3530556 A1 | 8/2019 |
| JP | 2012166781 A | 9/2012 |
| JP | 2013252811 A | 12/2013 |
| JP | 5525638 B1 | 6/2014 |
| JP | 2017119475 A | 7/2017 |
| TW | 200626407 A | 8/2006 |
| TW | 201043507 A | 12/2010 |
| TW | M441589 U | 11/2012 |
| WO | 2014097397 A1 | 6/2014 |
| WO | 2019187426 A1 | 10/2019 |

* cited by examiner

LIGHT EMITTING DEVICE

CROSS-REFERENCE TO RELATED APPLICATIONS

This is a divisional application of U.S. application Ser. No. 17/203,915, filed on Mar. 17, 2021 and allowed on Jul. 1, 2022, which is in turn based upon and claims the benefit of priority of the prior Japanese Patent Application No. 2020-065015, filed on Mar. 31, 2020. The contents of the prior applications are incorporated herein by reference.

TECHNICAL FIELD

The present teaching relates to a light emitting device for use in a leaning vehicle, and specifically to a light emitting device including left and right cornering lamps.

BACKGROUND ART

A leaning vehicle is conventionally known. The leaning vehicle includes a vehicle body configured to lean in a left direction in turning left and to lean in a right direction in turning right.

The leaning vehicle includes a light emitting device, too. The light emitting device, which is supported by the vehicle body, leans in the left direction together with the vehicle body in turning left, and leans in the right direction together with the vehicle body in turning right.

The type of the light emitting device not only includes a headlamp but also left and right cornering lamps as proposed in International Publication No. 2019/187426 (hereinafter, Patent Document 1). The left and right cornering lamps emit light such that a light emission area visually recognizable by a rider of a leaning vehicle is formed on a road surface at the left-front of a vehicle body when the leaning vehicle turns left, and to emit light such that a light emission area visually recognizable by the rider of the leaning vehicle is formed on a road surface at the right-front of the vehicle body when the leaning vehicle turns right.

PRIOR ART DOCUMENTS

Patent Documents

Patent Document 1: International Publication No. 2019/187426

SUMMARY OF THE INVENTION

Problems to be Solved by the Invention

In a light emitting device including left and right cornering lamps as described above, light emission areas formed by the left and right cornering lamps vary in accordance with the lean angle of a vehicle body. More specifically, the light emission areas formed by the left and right cornering lamps increase as the lean angle of the vehicle body increases.

According to Patent Document 1, each of the left and right cornering lamps has two or more light sources. As the lean angle of the vehicle body increases, the number of light sources turned on increases. That is, a light emission area formed by a light source that is newly turned on appears in addition and next to a light emission area formed by a light source that has already been turned on. As a result, the size of the entire light emission area increases.

In Patent Document 1, the light emission area increases sequentially, step-by-step as the lean angle of the vehicle body increases. This tends to produce bright/dark contrast in the light emission area while the light emission area becomes larger, the specifics of which are as follows.

For instance, assume a case where a new light emission area (second light emission area) is additionally formed next to a light emission area (first light emission area) that has already been formed, as the lean angle of the vehicle body increases. In this case, when an edge portion of the first light emission area overlaps an edge portion of the second light emission area, the overlapping portion is brighter than the other portion of the first light emission area and the other portion of the second light emission area. Keeping the edge portion of the first light emission area from overlapping the edge portion of the second light emission area results in a gap being formed between the first light emission area and the second light emission area, the gap being darker than the first light emission area and the second light emission area.

The present teaching aims to provide a light emitting device and a leaning vehicle including the light emitting device, the light emitting device being capable of suppressing occurrence of bright/dark contrast in a light emission area while the light emission area becomes larger.

Means for Solving the Problems

A light emitting device according to an embodiment of the present teaching is used in a leaning vehicle. The leaning vehicle includes a vehicle body. The vehicle body leans in a left direction when the leaning vehicle turns left. The vehicle body leans in a right direction when the leaning vehicle turns right.

The light emitting device according to the embodiment of the present teaching is supported by the vehicle body. Thus, the light emitting device according to the embodiment of the present teaching leans in the left direction together with the vehicle body when the leaning vehicle turns left. The light emitting device according to the embodiment of the present teaching leans in the right direction together with the vehicle body when the leaning vehicle turns right.

The light emitting device according to the embodiment of the present teaching includes a pair of cornering lamps and a control device. The pair of cornering lamps emit light such that a single left-front light emission area visually recognizable by a rider of the leaning vehicle is formed on a road surface at the left-front of the vehicle body when the leaning vehicle turns left. The pair of cornering lamps emit light such that a single right-front light emission area visually recognizable by the rider of the leaning vehicle is formed on a road surface at the right-front of the vehicle body when the leaning vehicle turns right. The control device controls light emission by the pair of cornering lamps based on a lean angle of the vehicle body.

The pair of cornering lamps each include at least one light source, a light travel direction changing member, and an outer lens. The light travel direction changing member is disposed corresponding to the at least one light source. The light travel direction changing member has a single light travel direction changing surface. The single light travel direction changing surface changes a travel direction of light outputted from the at least one light source such that the single left-front light emission area is formed on a road surface at the left-front of the vehicle body when the leaning vehicle turns left, or such that the single right-front light emission area is formed on a road surface at the right-front of the vehicle body when the leaning vehicle turns right. The outer lens is disposed corresponding to the light travel direction changing member. The outer lens allows light outputted from the at least one light source, of which travel direction is then changed by the single light travel direction changing surface, to be transmitted therethrough such that the single left-front light emission area is formed on a road surface at the left-front of the vehicle body when the leaning vehicle turns left or such that the single right-front light emission area is formed on a road surface at the right-front of the vehicle body when the leaning vehicle turns right.

The control device causes the quantity of light outputted from the at least one light source included in a first cornering lamp out of the pair of cornering lamps to vary in accordance with the lean angle of the vehicle body such that the single left-front light emission area, which is formed on a road surface at the left-front of the vehicle body, becomes larger as the lean angle of the vehicle body increases, the single left-front light emission area being formed by light that is outputted from the at least one light source included in the first cornering lamp when the leaning vehicle turns left, of which travel direction is then changed by the single light travel direction changing surface included in the first cornering lamp, and that is then transmitted through the outer lens included in the first cornering lamp.

The control device controls the quantity of light outputted from the at least one light source included in the first cornering lamp such that the size of a first left lean angle range becomes equal to or larger than the size of a second left lean angle range. The first left lean angle range is a lean angle range of the vehicle body where the quantity of light outputted from the at least one light source included in the first cornering lamp is increased as the lean angle of the vehicle body increases. The second left lean angle range is a lean angle range of the vehicle body in a period from when the vehicle body starts leaning to when the at least one light source included in the first cornering lamp is turned on.

The control device causes the quantity of light outputted from the at least one light source included in a second cornering lamp out of the pair of cornering lamps to vary in accordance with the lean angle of the vehicle body such that the single right-front light emission area, which is formed on a road surface at the right-front of the vehicle body, becomes larger as the lean angle of the vehicle body increases, the single right-front light emission area being formed by light that is outputted from the at least one light source included in the second cornering lamp when the leaning vehicle turns right, of which travel direction is then changed by the single light travel direction changing surface included in the second cornering lamp, and that is then transmitted through the outer lens included in the second cornering lamp.

The control device controls the quantity of light outputted from the at least one light source included in the second cornering lamp such that the size of a first right lean angle range becomes equal to or larger than the size of a second right lean angle range. The first right lean angle range is a lean angle range of the vehicle body where the quantity of light outputted from the at least one light source included in the second cornering lamp is increased as the lean angle of the vehicle body increases. The second right lean angle range is a lean angle range of the vehicle body in a period from when the vehicle body starts leaning to when the at least one light source included in the second cornering lamp is turned on.

The foregoing light emitting device can suppress occurrence of bright/dark contrast in a light emission area while the light emission area becomes larger, the light emission area being formed on a road surface at the left-front or right-front of the vehicle body included in the leaning vehicle when the leaning vehicle turns. The reason therefor is as follows.

In the foregoing light emitting device, a light emission area that is formed when the leaning vehicle turns left is the single left-front light emission area, and the single left-front light emission area becomes larger as the lean angle of the vehicle body increases. Accordingly, occurrence of bright/dark contrast in a light emission area can be suppressed while the light emission area becomes larger, the light emission area being formed on a road surface at the left-front of the vehicle body included in the leaning vehicle when the leaning vehicle turns left.

In the foregoing light emitting device, a light emission area that is formed when the leaning vehicle turns right is the single right-front light emission area, and the single right-front light emission area becomes larger as the lean angle of the vehicle body increases. Accordingly, occurrence of bright/dark contrast in a light emission area can be suppressed while the light emission area becomes larger, the light emission area being formed on a road surface at the right-front of the vehicle body included in the leaning vehicle when the leaning vehicle turns right.

The leaning vehicle in which the light emitting device according to the embodiment of the present teaching is used may be a vehicle driven by a rider, or may be an autonomous vehicle, for example. The leaning vehicle includes at least one front wheel and at least one rear wheel, for example. In other words, the leaning vehicle is not limited to two-wheel vehicles, but may be a three-wheel vehicle of which front wheel or rear wheel is composed of a left-right pair of wheels, or may be a four-wheel vehicle of which front wheel and rear wheel each is composed of a left-right pair of wheels. The leaning vehicle includes at least one steerable wheel and at least one driving wheel, for example. In a leaning vehicle including a front wheel and a rear wheel, either the front wheel or the rear wheel may serve as the steerable wheel. In a leaning vehicle including a front wheel and a rear wheel, either the front wheel or the rear wheel may serve as the driving wheel. The leaning vehicle includes a driving source that generates power for making the leaning vehicle travel, for example. The driving source may be an engine, an electric motor, or a combination of an engine and an electric motor, for example. In a case of the driving source being the engine, the leaning vehicle may include a supercharging mechanism, for example. The supercharging mechanism may be either a turbocharger or a supercharger, for example.

The light emitting device according to the embodiment of the present teaching may be used in a leaning vehicle of which vehicle body is caused to lean either by a rider's weight shifting or the like or by power transmitted from an actuator provided in the leaning vehicle, for example. The vehicle body caused to lean by a rider's weight shifting or the like is a vehicle body configured to increase the lean angle as the gravity acts thereon, for example. The actuator that causes the vehicle body to lean may be an actuator configured to assist a rider in performing an action of leaning the vehicle body, or may be an actuator configured to cause the vehicle body to lean in response to a rider's inputting an operation of leaning the vehicle body, for example. The vehicle body includes a vehicle body frame. The vehicle body frame may be a frame composed of two or more components in combination, or may be a frame composed of two or more components integrally molded. A material of the vehicle body frame may be a metal such as aluminum or iron, a synthetic resin such as CFRP, or a combination of them. The vehicle body frame may be constituted by an exterior component of the leaning vehicle (monocoque structure), or may partially serve as an exterior component of the leaning vehicle (semimonocoque structure).

In the light emitting device according to the embodiment of the present teaching, the pair of cornering lamps may be arranged side by side in a left-right direction of the vehicle body, or may be arranged one above the other in an up-down direction of the vehicle body, for example.

In the light emitting device according to the embodiment of the present teaching, the type of the at least one light source is not particularly limited. The at least one light source may be a semiconductor laser, an HID (High-Intensity Discharge) valve, a halogen lamp, an incandescent lamp, or the like, for example. Preferably, the at least one light source is a semiconductor light source such as a light emitting diode or a semiconductor laser. The at least one light source outputs light if the lean angle of the vehicle body becomes equal to or greater than a predetermined lean angle while the leaning vehicle is turning, for example.

In the light emitting device according to the embodiment of the present teaching, the light travel direction changing member included in each of the pair of cornering lamps is just required to have a function for changing the travel direction of light outputted from the at least one light source. The aspect of changing the travel direction of light outputted from the at least one light source encompasses an aspect in which the light travel direction changing surface included in the light travel direction changing member reflects light outputted from the at least one light source, for example. For instance, the light travel direction changing member may be: a reflector including a single reflector surface for reflecting light outputted from the at least one light source; a light guide member on which light from the at least one light source is incident, the light guide member being configured to cause the light incident thereon to be totally reflected therein, to output the resulting light in the front direction of the leaning vehicle; or a lens on which light from the at least one light source is directly incident, the lens being configured to refract the light directly incident thereon.

In the light emitting device according to the embodiment of the present teaching, the control device is, for example, an ECU (Electric Control Unit). The ECU is implemented by, for example, a combination of an IC (Integrated Circuit), an electronic component, a circuit board, and the like.

In the light emitting device according to the embodiment of the present teaching, the aspect in which the at least one light source is turned on encompasses an aspect in which the at least one light source outputs light. That is, it may not always be necessary that the quantity of light that is outputted from the at least one light source when the at least one light source is turned on is its maximum. It is just required that the quantity of light that is outputted from the at least one light source when the at least one light source starts being turned on is not its maximum. For example, across a process of increasing the quantity of light that is outputted from the at least one light source, the quantity of light that is outputted from the at least one light source is smallest when the at least one light source starts being turned on. In other words, for example, across a process of varying the quantity of light that is outputted from the at least one light source, the quantity of light that is outputted from the at least one light source is smallest when the at least one light source starts being turned on.

In the light emitting device according to the embodiment of the present teaching, the aspect of increasing the quantity of light outputted from the at least one light source encompasses the following aspects, for example. In a case where the at least one light source is a single light source, the aspect of increasing the quantity of light outputted from the at least one light source encompasses an aspect of increasing a voltage that is applied to the light source for making the light source output light, for example. The aspect of increasing the voltage that is applied to the light source encompasses an aspect of increasing the ratio (the duty cycle, as it is called) between a period in which the voltage is applied to the light source and a period in which the voltage is not applied to the light source, for example. In a case where the at least one light source comprises two or more light sources, the aspect of increasing the quantity of light outputted from the at least one light source encompasses an aspect of increasing the number of light sources outputting light, for example. In other words, in a case where the at least one light source comprises two or more light sources, the aspect of increasing the quantity of light outputted from the at least one light source encompasses an aspect of increasing the number of light sources turned on, for example.

In the light emitting device according to the embodiment of the present teaching, an increase in the lean angle of the vehicle body means an increase in the absolute value of the lean angle of the vehicle body.

In the light emitting device according to the embodiment of the present teaching, a location having the highest illuminance in the single left-front light emission area may be closer to the vehicle body than the center of the single left-front light emission area is. A location having the highest illuminance in the single right-front light emission area may be closer to the vehicle body than the center of the single right-front light emission area is.

The foregoing light emitting device can brightly illuminate the vicinity of the vehicle body when the leaning vehicle turns.

In the light emitting device according to the embodiment of the present teaching, the control device may cause the quantity of light outputted from the at least one light source included in the first cornering lamp to vary in accordance with the lean angle of the vehicle body such that the single left-front light emission area becomes larger as the lean angle of the vehicle body increases, by broadening to extend further in the left-front direction of the vehicle body. The control device may cause the quantity of light outputted from the at least one light source included in the second cornering lamp to vary in accordance with the lean angle of the vehicle body such that the single right-front light emission area becomes larger as the lean angle of the vehicle body increases, by broadening to extend further in the right-front direction of the vehicle body.

In the foregoing light emitting device, when the lean angle of the vehicle body increases, the emission can reach a position far from the vehicle body.

In the light emitting device according to the embodiment of the present teaching, the control device may cause the quantity of light outputted from the at least one light source included in the first cornering lamp to vary in accordance with the lean angle of the vehicle body such that the single left-front light emission area becomes larger as the lean angle of the vehicle body increases, by broadening to extend further in the left-front direction of the vehicle body and also broadening to extend in a direction that is perpendicular to a direction in which the single left-front light emission area extends and that is parallel to the road surface on which the single left-front light emission area is formed. The control device may cause the quantity of light emitted from the at least one light source included in the second cornering lamp to vary in accordance with the lean angle of the vehicle body such that the single right-front light emission area becomes larger as the lean angle of the vehicle body increases, by broadening to extend further in the right-front direction of the vehicle body and also broadening to extend in a direction that is perpendicular to a direction in which the single right-front light emission area extends and that is parallel to the road surface on which the single right-front light emission area is formed.

In the foregoing light emitting device, when the lean angle of the vehicle body increases, the width of the light emission area increases, too. Accordingly, various lean angles of the vehicle body can be responded to.

In the light emitting device according to the embodiment of the present teaching, in a case of varying the size of the single left-front light emission area, the control device may cause the quantity of light outputted from the at least one light source included in the first cornering lamp to continuously vary in accordance with the lean angle of the vehicle body. In a case of varying the size of the single right-front light emission area, the control device may cause the quantity of light outputted from the at least one light source included in the second cornering lamp to continuously vary in accordance with the lean angle of the vehicle body.

The foregoing light emitting device enables the size of the light emission area to smoothly vary as the lean angle of the vehicle body varies while the leaning vehicle is turning.

In the light emitting device according to the embodiment of the present teaching, the aspect in which the control device causes the quantity of light outputted from the at least one light source to continuously vary encompasses an aspect in which, for example, a period in which the quantity of light outputted from the at least one light source is maintained at a fixed quantity is not present in a process from when the at least one light source starts outputting light to when the quantity of light outputted from the at least one light source is maximized. The period in which the quantity of light outputted from the at least one light source is maintained at a fixed quantity is, for example, a period in which the quantity of light outputted from the at least one light source does not vary even though the lean angle of the vehicle body varies.

In the light emitting device according to the embodiment of the present teaching, in a case of varying the size of the single left-front light emission area, the control device may cause the quantity of light outputted from the at least one light source included in the first cornering lamp to vary at least three times in accordance with the lean angle of the vehicle body. In a case of varying the size of the single right-front light emission area, the control device may cause the quantity of light outputted from the at least one light source included in the second cornering lamp to vary at least three times in accordance with the lean angle of the vehicle body.

In the foregoing light emitting device, the size of a light emission area can be varied by stages in response to the lean angle of the vehicle body varying while the leaning vehicle is turning.

In the light emitting device according to the embodiment of the present teaching, the aspect in which the control device causes the quantity of light outputted from the at least one light source to vary at least three times may encompass an aspect in which, for example, a period in which the quantity of light outputted from the at least one light source is maintained at a fixed quantity is not present in a process from when the at least one light source starts outputting light to when the quantity of light outputted from the at least one light source is maximized, or may encompass an aspect in which, for example, a period in which the quantity of light outputted from the at least one light source is maintained at a fixed quantity is present in a process from when the at least one light source starts outputting light to when the quantity of light outputted from the at least one light source is maximized. The period in which the quantity of light outputted from the at least one light source is maintained at a fixed quantity is, for example, a period in which the quantity of light outputted from the at least one light source does not vary even though the lean angle of the vehicle body varies.

In the light emitting device according to the embodiment of the present teaching, in a case of varying the size of the single left-front light emission area, the control device may cause the quantity of light outputted from the at least one light source included in the first cornering lamp to increase or be maintained as the lean angle of the vehicle body increases. In a case of varying the size of the single right-front light emission area, the control device may cause the quantity of light outputted from the at least one light source included in the second cornering lamp to increase or be maintained as the lean angle of the vehicle body increases.

In the foregoing light emitting device, a light emission area that is formed on a road surface at the left-front or right-front of the vehicle body while the leaning vehicle is turning can be broadened as the lean angle of the vehicle body increases.

In the light emitting device according to the embodiment of the present teaching, in a case of varying the size of the single left-front light emission area, the control device may cause the quantity of light outputted from the at least one light source included in the first cornering lamp to increase as the lean angle of the vehicle body increases, until maximization of the size of the single left-front light emission area. In a case of varying the size of the single right-front light emission area, the control device may cause the quantity of light outputted from the at least one light source included in the second cornering lamp to increase as the lean angle of the vehicle body increases, until maximization of the size of the single right-front light emission area.

In the foregoing light emitting device, a light emission area that is formed on a road surface at the left-front or right-front of the vehicle body while the leaning vehicle is turning can be broadened as the lean angle of the vehicle body increases.

In the light emitting device according to the embodiment of the present teaching, the control device may cause the quantity of light outputted from the at least one light source included in the first cornering lamp to increase at a higher rate as the lean angle of the vehicle body increases in a second-half range than in a first-half range, the first-half range and second-half range resulting from bisection of the first left lean angle range. The control device may cause the quantity of light outputted from the at least one light source included in the second cornering lamp to increase at a higher rate as the lean angle of the vehicle body increases in a second-half range than in a first-half range, the first-half range and second-half range resulting from bisection of the first right lean angle range.

In the foregoing light emitting device, a reduction of a light emission area along with an increase in the lean angle of the vehicle body can be avoided, and therefore the light emission area can be broadened when the lean angle of the vehicle body increases, too.

In the light emitting device according to the embodiment of the present teaching, the pair of cornering lamps may be arranged side by side in a left-right direction of the vehicle body. The first cornering lamp may be a left one of the pair of cornering lamps arranged side by side in the left-right direction of the vehicle body. The second cornering lamp may be a right one of the pair of cornering lamps arranged side by side in the left-right direction of the vehicle body.

In the foregoing light emitting device, one of the pair of cornering lamps that is closer to a road surface when the leaning vehicle turns can be caused to emit light. A leaning vehicle according to the embodiment of the present teaching includes a vehicle body and a light emitting device. The vehicle body leans in a left direction when the leaning vehicle turns left. The vehicle body leans in a right direction when the leaning vehicle turns right. The light emitting device is supported by the vehicle body. The light emitting device leans in the left direction together with the vehicle body when the leaning vehicle turns left. The light emitting device leans in the right direction together with the vehicle body when the leaning vehicle turns right. The light emitting device is the light emitting device according to any of the aspects described above.

The above and other aims, features, aspects, and advantages of the present teaching will become more apparent from the following detailed description of some embodiments of the present teaching given with reference to the attached drawings.

As used herein, the term "and/or" includes any and all combinations of one or more of the associated listed items.

As used herein, the terms "including", "comprising", or "having", and variations thereof specify the presence of stated features, steps, operations, elements, components, and/or equivalents thereof, and can include one or more of steps, operations, elements, components, and/or their groups.

Unless otherwise defined, all terms (including technical and scientific terms) used herein have the same meaning as commonly understood by one of ordinary skilled in the art to which the present teaching belongs.

It will be understood that terms, such as those defined in commonly used dictionaries, should be interpreted as having a meaning that is consistent with their meaning in the context of the present disclosure and relevant art and should not be interpreted in an idealized or overly formal sense unless expressly so defined herein.

It will be understood that the description of the present teaching discloses a number of techniques and steps. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, Description and Claims should be read with the understanding that such combinations are entirely within the scope of the present teaching and the claims.

In the description given below, for the purposes of explanation, numerous specific details are set forth in order to provide a thorough understanding of the present teaching. It will be apparent, however, that those skilled in the art may practice the present teaching without these specific details. The present disclosure is to be considered as an exemplification of the present teaching, and is not intended to limit the present teaching to the specific embodiments illustrated by drawings or descriptions below.

Effects of the Invention

The present teaching can provide a light emitting device and a leaning vehicle including the light emitting device, the light emitting device being capable of suppressing occurrence of bright/dark contrast in a light emission area while the light emission area becomes larger.

EMBODIMENTS FOR CARRYING OUT THE INVENTION

In the following, a leaning vehicle according to an embodiment of the present teaching will be detailed with reference to the drawings. The embodiment described below is merely an exemplification. Interpretation of the present teaching should not be limited by the embodiment described below.

Embodiment

Figure 1:
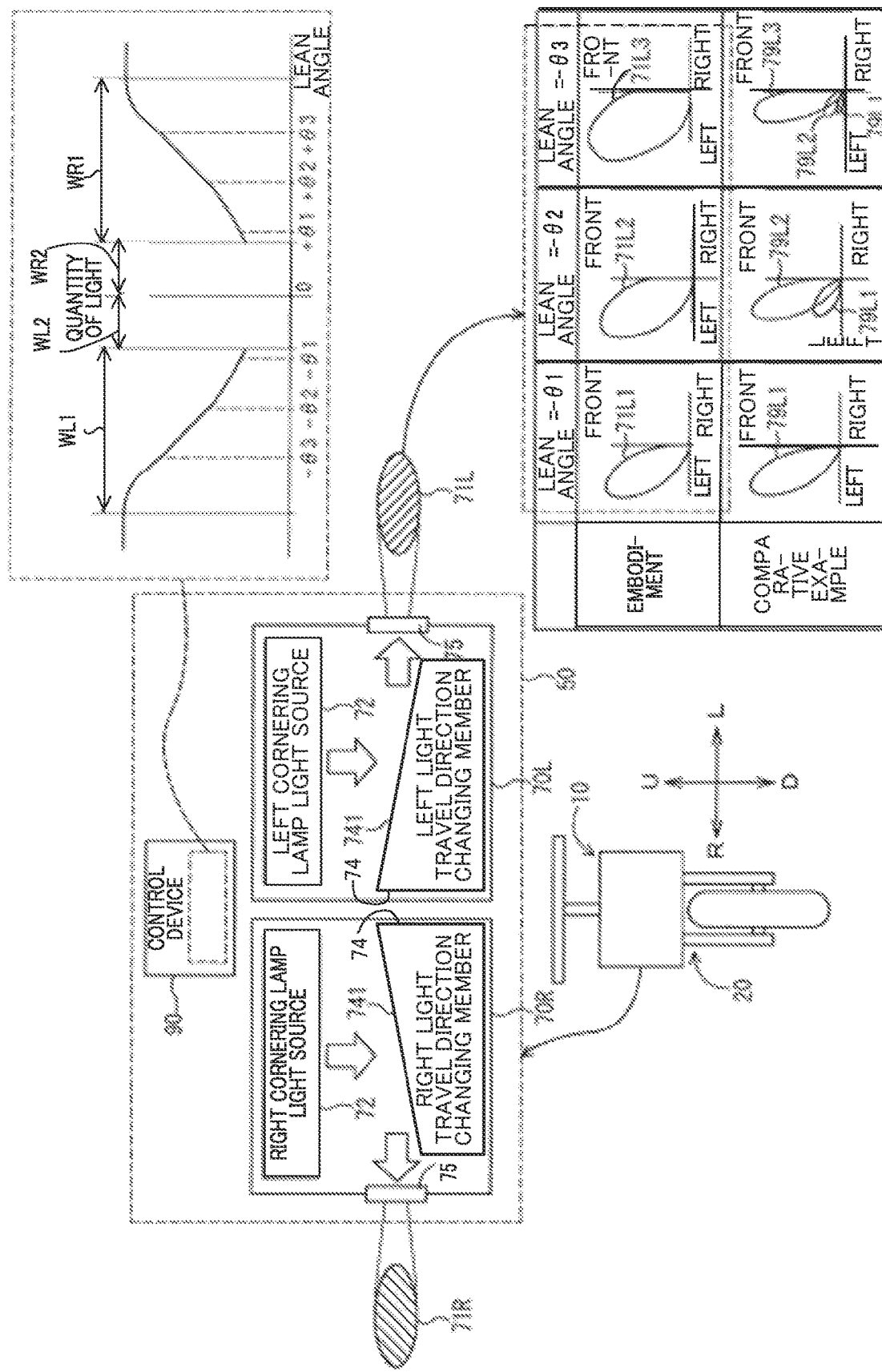
FIG. 1 is a diagram containing: a conceptual diagram showing a leaning vehicle and a light emitting device according to an embodiment of the present teaching; a graph showing the relationship between the lean angle of a vehicle body and the quantity of light outputted from light sources of a pair of cornering lamps included in the light emitting device according to the embodiment of the present teaching; and an explanatory diagram showing how the size of a single left-front light emission area varies with juxtaposition of a comparative example, the single left-front light emission area being formed by light outputted from the light sources of the pair of cornering lamps included in the light emitting device according to the embodiment of the present teaching.

Referring to FIG. 1, a leaning vehicle 10 and a light emitting device 50 according to an embodiment of the present teaching will be described. FIG. 1 is a diagram containing: a conceptual diagram showing the leaning vehicle 10 and the light emitting device 50; a graph showing the relationship between the lean angle of a vehicle body 20 and the quantity of light outputted from light sources 72 of a pair of cornering lamps 70L, 70R included in the light emitting device 50; and an explanatory diagram showing how the size of a single left-front light emission area 71L varies with juxtaposition of a comparative example, the single left-front light emission area 71L being formed by light outputted from the light sources 72 of the pair of cornering lamps 70L, 70R included in the light emitting device 50. In FIG. 1, the light emission areas are illustrated conceptually.

In the specification herein, directions in relation to the leaning vehicle 10 are defined as follows.

The front direction of the leaning vehicle 10 is defined as front direction F. The back direction of the leaning vehicle 10 is defined as back direction B. The left direction of the leaning vehicle 10 is defined as left direction L. The right direction of the leaning vehicle 10 is defined as right direction R. The up direction of the leaning vehicle 10 is defined as up direction U. The down direction of the leaning vehicle 10 is defined as down direction D. The front-back direction of the leaning vehicle 10 is defined as front-back direction FB. The left-right direction of the leaning vehicle 10 is defined as left-right direction LR. The up-down direction of the leaning vehicle 10 is defined as up-down direction UD. The front, back, up, down, left, and right of the leaning vehicle 10 are respectively the front, back, up, down, left, and right in a view of a rider sitting on a seat (not shown) of the leaning vehicle 10.

The leaning vehicle 10 has the vehicle body 20, as will be described later. The front direction of the vehicle body 20 is defined as front direction f. The back direction of the vehicle body 20 is defined as back direction b. The left direction of the vehicle body 20 is defined as left direction l. The right direction of the vehicle body 20 is defined as right direction r. The up direction of the vehicle body 20 is defined as up direction u. The down direction of the vehicle body 20 is defined as down direction d. The front-back direction of the vehicle body 20 is defined as front-back direction fb. The left-right direction of the vehicle body 20 is defined as left-right direction lr. The up-down direction of the vehicle body 20 is defined as up-down direction ud.

In the leaning vehicle 10, the vehicle body 20 is capable of leaning in the left direction L or in the right direction R. While the vehicle body 20 is leaning in the left direction L or in the right direction R, the up-down direction ud and the left-right direction lr of the vehicle body 20 do not coincide with the up-down direction UD and the left-right direction LR of the leaning vehicle 10. On the other hand, while the vehicle body 20 is upright, the up-down direction ud and left-right direction lr of the vehicle body 20 coincide with the up-down direction UD and the left-right direction LR of the leaning vehicle 10.

Referring to FIG. 1, the leaning vehicle 10 includes the vehicle body 20 and the light emitting device 50. Descriptions of them will follow hereinafter.

The vehicle body 20 leans in the left direction L when the leaning vehicle 10 turns left. The vehicle body 20 leans in the right direction R when the leaning vehicle 10 turns right.

The light emitting device 50 is supported by the vehicle body 20. When the leaning vehicle 10 turns left, the light emitting device 50 leans in the left direction L together with the vehicle body 20. When the leaning vehicle 10 turns right, the light emitting device 50 leans in the right direction R together with the vehicle body 20.

The light emitting device 50 includes the pair of cornering lamps 70L, 70R and a control device 90. Descriptions of them will follow hereinafter.

When the leaning vehicle 10 turns left, a first cornering lamp out of the pair of cornering lamps 70L, 70R emits light such that the single left-front light emission area 71L visually recognizable by the rider of the leaning vehicle 10 is formed on a road surface at the left-front of the vehicle body 20. The single left-front light emission area 71L visually recognizable by the rider of the leaning vehicle 10 is, for example, a light emission area that is formed on a road surface at the left-front of the vehicle body 20 included in the leaning vehicle 10 when the leaning vehicle 10 turns left, the light emission area having an illuminance equal to or higher than a few percent of the maximum illuminance of this light emission area.

When the leaning vehicle 10 turns right, a second cornering lamp out of the pair of cornering lamps 70L, 70R emits light such that the single right-front light emission area 71R visually recognizable by the rider of the leaning vehicle 10 is formed on a road surface at the right-front of the vehicle body 20. The single right-front light emission area 71R visually recognizable by the rider of the leaning vehicle 10 is, for example, a light emission area formed on a road surface at the right-front of the vehicle body 20 included in the leaning vehicle 10 when the leaning vehicle turns left, the light emission area having an illuminance equal to or higher than a few percent of the maximum illuminance of this light emission area.

Each of the pair of cornering lamps 70L, 70R includes at least one cornering lamp light source 72 serving as at least one light source, a light travel direction changing member 74, and an outer lens 75. Descriptions of them will follow hereinafter.

The light travel direction changing member 74 is disposed corresponding to the at least one cornering lamp light source 72. The light travel direction changing member 74 includes a single light travel direction changing surface 741. The single light travel direction changing surface 741 changes a travel direction of light outputted from the at least one cornering lamp light source 72. More specifically, the single light travel direction changing surface 741 changes the travel direction of light outputted from the at least one cornering lamp light source 72 such that the single left-front light emission area 71L is formed on a road surface at the left-front of the vehicle body 20 when the leaning vehicle 10 turns left, or such that the single right-front light emission area 71R is formed on a road surface at the right-front of the vehicle body 20 when the leaning vehicle 10 turns right.

The outer lens 75 is disposed corresponding to the light travel direction changing member 74. The outer lens 75 allows light outputted from the at least one cornering lamp light source 72, of which travel direction is then changed by the single light travel direction changing surface 741, to be transmitted therethrough such that the single left-front light emission area 71L is formed on a road surface at the left-front of the vehicle body 20 when the leaning vehicle 10 turns left, or such that the single right-front light emission area 71R is formed on a road surface at the right-front of the vehicle body 20 when the leaning vehicle 10 turns right.

The control device 90 controls light emission by the pair of cornering lamps 70L, 70R based on the lean angle of the vehicle body 20. Specifically, it is as follows.

The control device 90 causes the quantity of light outputted from the at least one cornering lamp light source 72 included in the first cornering lamp out of the pair of cornering lamps 70L, 70R to vary in accordance with the lean angle of the vehicle body 20 such that the single left-front light emission area 71L, which is formed on a road surface at the left-front of the vehicle body 20 when the leaning vehicle 10 turns left, becomes larger as the lean angle of the vehicle body 20 increases. Here, an increase in the lean angle of the vehicle body 20 means an increase in the absolute value of the lean angle of the vehicle body 20.

The control device 90 controls the quantity of light outputted from the at least one cornering lamp light source 72 included in the first cornering lamp such that the size of a first left lean angle range WL1 becomes equal to the size of a second left lean angle range WL2 or becomes larger than the size of the second left lean angle range WL2. The size of the first left lean angle range WL1 corresponds to a lean angle range of the vehicle body 20 where the quantity of light outputted from the at least one cornering lamp light source 72 included in the first cornering lamp is increased as the lean angle of the vehicle body 20 increases. The size of the second left lean angle range WL2 corresponds to a lean angle range of the vehicle body 20 in a period from when the vehicle body 20 starts leaning to when the at least one cornering lamp light source 72 included in the first cornering lamp is turned on.

The control device 90 causes the quantity of light outputted from the at least one cornering lamp light source 72 included in the second cornering lamp out of the pair of cornering lamps 70L, 70R to vary in accordance with the lean angle of the vehicle body 20 such that the single right-front light emission area 71R, which is formed on a road surface at the right-front of the vehicle body 20 when the leaning vehicle 10 turns right, becomes larger as the lean angle of the vehicle body 20 increases. Here, an increase in the lean angle of the vehicle body 20 means an increase in the absolute value of the lean angle of the vehicle body 20.

The control device 90 controls the quantity of light outputted from the at least one cornering lamp light source 72 included in the second cornering lamp such that the size of a first right lean angle range WR1 becomes equal to the size of a second right lean angle range WR2 or becomes larger than the size of the second right lean angle range WR2. The size of the first right lean angle range WR1 corresponds to a lean angle range of the vehicle body 20 where the quantity of light outputted from the at least one cornering lamp light source 72 included in the second cornering lamp is increased as the lean angle of the vehicle body 20 increases. The size of the second right lean angle range WR2 corresponds to a lean angle range of the vehicle body 20 in a period from when the vehicle body 20 starts leaning to when the at least one cornering lamp light source 72 included in the second cornering lamp is turned on.

The above-described leaning vehicle 10 includes the light emitting device 50. Accordingly, occurrence of bright/dark contrast in a light emission area can be suppressed while the light emission area becomes larger, the light emission area being formed on a road surface at the left-front or right-front of the vehicle body 20 when the leaning vehicle 10 turns. The reason therefor is as follows.

The light emitting device 50 is configured such that: a light emission area formed when the leaning vehicle 10 turns left is the single left-front light emission area 71L; and the single left-front light emission area 71L becomes larger as the lean angle of the vehicle body 20 increases. In a comparative example, on the other hand, as the lean angle of the vehicle body 20 increases, a light emission area formed by a light source that is newly turned on appears in addition and next to a light emission area formed by a light source that has been already turned on.

More specifically, when the lean angle of the vehicle body 20 is −θ1, in the comparative example, only a first light emission area 79L1 is formed. When the lean angle of the vehicle body 20 is −θ2, in the comparative example, the size of the first light emission area 79L1 is reduced while a second light emission area 79L2 is formed next to the first light emission area 79L1. A part of the second light emission area 79L2 overlaps a part of the first light emission area 79L1. When the lean angle of the vehicle body 20 is −θ3, in the comparative example, the sizes of the first light emission area 79L1 and the second light emission area 79L2 are reduced while a third light emission area 79L3 is formed next to the second light emission area 79L2. A part of the third light emission area 79L3 overlaps a part of the second light emission area 79L2, but does not overlap a part of the first light emission area 79L1.

In the comparative example, a part of the second light emission area 79L2 overlaps a part of the first light emission area 79L1, and a part of the third light emission area 79L3 overlap a part of the second light emission area 79L2. Accordingly, a region where a part of the second light emission area 79L2 overlaps a part of the first light emission area 79L1 is brighter than the other regions in the first light emission area 79L1 and the other regions in the second light emission area 79L2. Likewise, a region where a part of the third light emission area 79L3 overlaps a part of the second light emission area 79L2 is brighter than the other regions. In the comparative example, therefore, bright/dark contrast occurs in a light emission area while the light emission area becomes larger, the light emission area being formed on a road surface at the left-front of the vehicle body included in the leaning vehicle when the leaning vehicle turns left.

On the other hand, the light emitting device 50 is configured such that: a light emission area formed when the leaning vehicle 10 turns left is the single left-front light emission area 71L; and the single left-front light emission area 71L becomes larger as the lean angle of the vehicle body 20 increases, as mentioned above. Accordingly, as compared to the comparative example, occurrence of bright/dark contrast in a light emission area can be suppressed while the light emission area becomes larger, the light emission area being formed on a road surface at the left-front of the vehicle body 20 included in the leaning vehicle 10 when the leaning vehicle 10 turns left.

The reason why occurrence of bright/dark contrast in a light emission area that is formed on a road surface at the right-front of the vehicle body 20 when the leaning vehicle 10 turns can be suppressed while this light emission area becomes larger will not be described, because it is the same as the reason why occurrence of bright/dark contrast in a light emission area that is formed on a road surface at the left-front of the vehicle body 20 when the leaning vehicle 10 turns can be suppressed while this light emission area becomes larger.

In the light emitting device 50, the control device 90 controls the quantity of light outputted from the at least one cornering lamp light source 72 included in the first cornering lamp such that the size of the first left lean angle range WL1 becomes equal to the size of the second left lean angle range WL2 or becomes larger than the size of the second left lean angle range WL2. This can form a necessary light emission area in accordance with the lean angle of the vehicle body 20, as compared to a configuration that makes the size of the first left lean angle range WL1 smaller than the size of the second left lean angle range WL2.

In the light emitting device 50, the control device 90 controls the quantity of light outputted from the at least one cornering lamp light source 72 included in the second cornering lamp such that the size of the first right lean angle range WR1 becomes equal to the size of the second right lean angle range WR2 or becomes larger than the size of the second right lean angle range WR2. This can form a necessary light emission area in accordance with the lean angle of the vehicle body 20, as compared to a configuration that makes the size of the first right lean angle range WR1 smaller than the size of the second right lean angle range WR2.

The light emitting device 50 can form a favorable light emission area when the vehicle speed increases, for the following reason.

When the vehicle speed increases, the emission needs to reach a farther position. Provided that the turning radius is fixed, the lean angle of the vehicle body 20 increases as the vehicle speed increases. In the light emitting device 50, its light emission area becomes larger as the lean angle of the vehicle body 20 increases. This is why a favorable light emission area can be formed when the vehicle speed increases.

In other words, when the vehicle speed is low, the emission does not need to reach as far as when the vehicle speed is high. Provided that the turning radius is fixed, the lean angle of the vehicle body 20 at a low vehicle speed is smaller than the lean angle of the vehicle body 20 at a high vehicle speed. In the light emitting device 50, its light emission area becomes larger as the lean angle of the vehicle body 20 increases. This is why a necessary light emission area can be formed in accordance with the lean angle of the vehicle body 20.

Specific Example of the Embodiment

Figure 2:
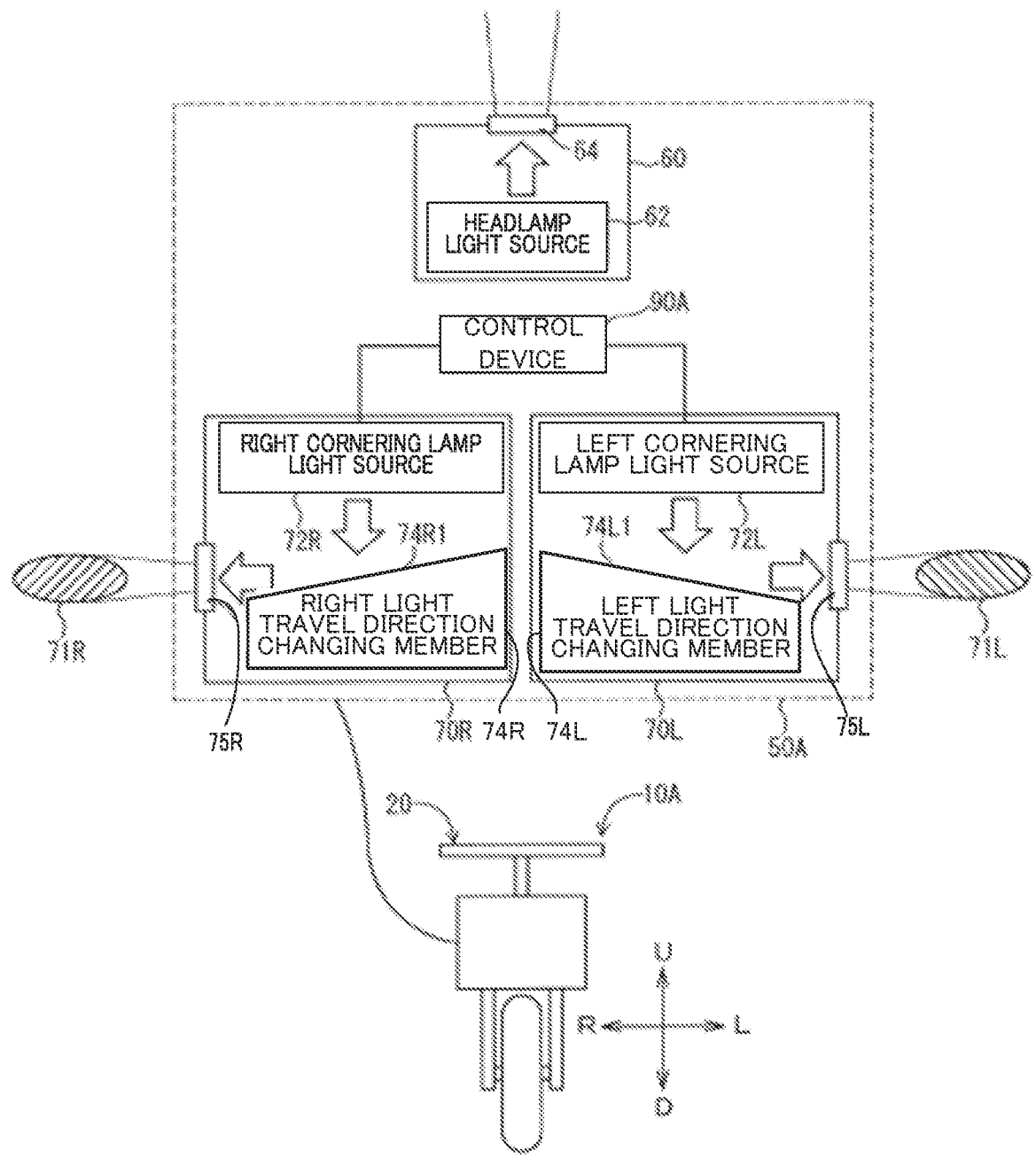
FIG. 2 is a conceptual diagram showing a leaning vehicle and a light emitting device according to a specific example of the embodiment of the present teaching.

Now, referring to FIG. 2, a description will be given to a leaning vehicle 10A and a headlamp device 50A serving as a light emitting device according to a specific example of the embodiment of the present teaching. FIG. 2 is a conceptual diagram showing the leaning vehicle 10A and the headlamp device 50A.

The leaning vehicle 10A is a motorcycle. The leaning vehicle 10A includes a vehicle body 20 and the headlamp device 50A. Descriptions of them will follow hereinafter.

The vehicle body 20 leans in the left direction L when the leaning vehicle 10A turns left. The vehicle body 20 leans in the right direction R when the leaning vehicle 10A turns right. The vehicle body 20 includes a vehicle body frame.

The headlamp device 50A is supported by the vehicle body 20. When the leaning vehicle 10A turns left, the headlamp device 50A leans in the left direction L together with the vehicle body 20. When the leaning vehicle 10A turns right, the headlamp device 50A leans in the right direction R together with the vehicle body 20.

The headlamp device 50A includes a headlamp 60, a pair of cornering lamps 70L, 70R, and a control device 90A. Descriptions of them will follow hereinafter.

The headlamp 60 emits light in the front direction of the vehicle body 20. The headlamp 60 includes at least one headlamp light source 62 and an outer lens 64. The at least one headlamp light source 62 is, for example, a light emitting diode (LED). The outer lens 64 is disposed at the front of the at least one headlamp light source 62. The outer lens 64 allows light outputted from the at least one headlamp light source 62 to be transmitted therethrough. The light output from the headlamp light source 62 may be implemented by the control device 90A, or by another control device, for example.

A first cornering lamp out of the pair of cornering lamps 70L, 70R emits light such that a single left-front light emission area 71L visually recognizable by a rider of the leaning vehicle 10A is formed on a road surface at the left-front of the vehicle body 20 when the leaning vehicle 10A turns left. In the headlamp device 50A, the left cornering lamp 70L emits light such that the single left-front light emission area 71L visually recognizable by the rider of the leaning vehicle 10A is formed on a road surface at the left-front of the vehicle body 20 when the leaning vehicle 10A turns left.

A second cornering lamp out of the pair of cornering lamps 70L, 70R emits light such that a single right-front light emission area 71R visually recognizable by the rider of the leaning vehicle 10A is formed on a road surface at the right-front of the vehicle body 20 when the leaning vehicle 10A turns right. In the headlamp device 50A, the right cornering lamp 70R emits light such that the single right-front light emission area 71R visually recognizable by the rider of the leaning vehicle 10A is formed on a road surface at the right-front of the vehicle body 20 when the leaning vehicle 10A turns right.

The pair of cornering lamps 70L, 70R are arranged side by side in the left-right direction lr of the vehicle body 20. Each of the pair of cornering lamps 70L, 70R includes at least one cornering lamp light source 72 serving as at least one light source, a light travel direction changing member 74, and an outer lens 75. To be specific, the left cornering lamp 70L includes at least one left cornering lamp light source 72L serving as at least one light source, a left light travel direction changing member 74L serving as a light travel direction changing member, and a left outer lens 75L serving as an outer lens. The right cornering lamp 70R includes at least one right cornering lamp light source 72R serving as at least one light source, a right light travel direction changing member 74R serving as a light travel direction changing member, and a right outer lens 75R. Descriptions of them will follow hereinafter.

The at least one left cornering lamp light source 72L is, for example, a light emitting diode (LED). The at least one left cornering lamp light source 72L is, for example, turned on in response to the lean angle of the vehicle body 20 becoming equal to or greater than a predetermined lean angle while the leaning vehicle 10A is turning left.

The left light travel direction changing member 74L is disposed corresponding to the at least one left cornering lamp light source 72L. The left light travel direction changing member 74L includes a single left light travel direction changing surface 74L1. The single left light travel direction changing surface 74L1 changes a travel direction of light outputted from the at least one left cornering lamp light source 72L. More specifically, the single left light travel direction changing surface 74L1 changes a travel direction of light outputted from the at least one left cornering lamp light source 72L such that the single left-front light emission area 71L is formed on a road surface at the left-front of the vehicle body 20 when the leaning vehicle 10A turns left, or such that the single right-front light emission area 71R is formed on a road surface at the right-front of the vehicle body 20 when the leaning vehicle 10A turns right. In the headlamp device 50A, the single left light travel direction changing surface 74L1 changes a travel direction of light outputted from the at least one left cornering lamp light source 72L such that the single left-front light emission area 71L is formed on a road surface at the left-front of the vehicle body 20 when the leaning vehicle 10A turns left.

The left light travel direction changing member 74L is, for example, a reflector that reflects light outputted from the at least one left cornering lamp light source 72L in the front direction of the leaning vehicle 10A. In this configuration, the left light travel direction changing surface 74L1 included in the left light travel direction changing member 74L is a single reflector surface that reflects light outputted from the at least one left cornering lamp light source 72L in the front direction of the leaning vehicle 10A.

The left light travel direction changing surface 74L1 included in the left light travel direction changing member 74L is, for example, arranged downward of the at least one left cornering lamp light source 72L. In this configuration, the at least one left cornering lamp light source 72L outputs light in the down direction of the vehicle body 20. The left light travel direction changing surface 74L1 included in the left light travel direction changing member 74L causes the light outputted from the at least one left cornering lamp light source 72L in the down direction of the vehicle body 20 to be reflected in the front direction of the leaning vehicle 10A.

The left outer lens 75L is disposed corresponding to the left light travel direction changing member 74L. The left outer lens 75L allows light outputted from the at least one left cornering lamp light source 72L, of which travel direction is then changed by the single light travel direction changing surface 74L1, to be transmitted therethrough such that the single left-front light emission area 71L is formed on a road surface at the left-front of the vehicle body 20 when the leaning vehicle 10A turns left.

The at least one right cornering lamp light source 72R is, for example, a light emitting diode (LED). The at least one right cornering lamp light source 72R is, for example, turned on in response to the lean angle of the vehicle body 20 becoming equal to or greater than a predetermined lean angle while the leaning vehicle 10A is turning right.

The right light travel direction changing member 74R is disposed corresponding to the at least one right cornering lamp light source 72R. The right light travel direction changing member 74R includes a single right light travel direction changing surface 74R1. The single right light travel direction changing surface 74R1 changes a travel direction of light outputted from the at least one right cornering lamp light source 72R. More specifically, the single right light travel direction changing surface 74R1 changes a travel direction of light outputted from the at least one right cornering lamp light source 72R such that the single right-front light emission area 71R is formed on a road surface at the right-front of the vehicle body 20 when the leaning vehicle 10 turns right.

The right light travel direction changing member 74R is, for example, a reflector that reflects light outputted from the at least one right cornering lamp light source 72R in the front direction of the leaning vehicle 10A. In this configuration, the right light travel direction changing surface 74R1 included in the right light travel direction changing member 74R is a single reflector surface that reflects light outputted from the at least one right cornering lamp light source 72R in the front direction of the leaning vehicle 10A.

The right light travel direction changing surface 74R1 included in the right light travel direction changing member 74R is, for example, arranged downward of the at least one right cornering lamp light source 72R. In this configuration, the at least one right cornering lamp light source 72R outputs light in the down direction of the vehicle body 20. The right light travel direction changing surface 74R1 included in the right light travel direction changing member 74R causes the light outputted from the at least one right cornering lamp light source 72R in the down direction of the vehicle body 20 to be reflected in the front direction of the leaning vehicle 10A.

The right outer lens 75R is disposed corresponding to the right light travel direction changing member 74R. The right outer lens 75R allows light outputted from the at least one right cornering lamp light source 72R, of which travel direction is then changed by the single light travel direction changing surface 74R1, to be transmitted therethrough such that the single right-front light emission area 71R is formed on a road surface at the right-front of the vehicle body 20 when the leaning vehicle 10A turns right.

The control device 90A controls light emission by the pair of cornering lamps 70L, 70R based on the lean angle of the vehicle body 20, the specifics of which are as follows.

The control device 90A causes the quantity of light outputted from the at least one left cornering lamp light source 72L to vary in accordance with the lean angle of the vehicle body 20 such that the single left-front light emission area 71L, which is formed on a road surface at the left-front of the vehicle body 20 when the leaning vehicle 10A turns left, becomes larger as the lean angle of the vehicle body 20 increases. Here, an increase in the lean angle of the vehicle body 20 means an increase in the absolute value of the lean angle of the vehicle body 20.

Figure 3:
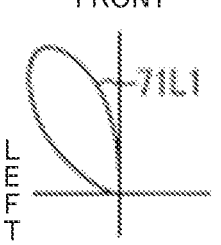
FIG. 3 is an explanatory diagram showing how the size of a single left-front light emission area and the size of a single right-front light emission area vary, the single left-front light emission area and the single right-front light emission area being formed by light outputted from light sources of a pair of cornering lamps included in the light emitting device according to the specific example of the embodiment of the present teaching.

Now, referring to FIG. 3, how the single left-front light emission area 71L becomes larger as the lean angle of the vehicle body 20 increases will be described. FIG. 3 is an explanatory diagram showing how the size of the single left-front light emission area 71L and the size of the single right-front light emission area 71R vary. In FIG. 3, each of the single left-front light emission area 71L and the single right-front light emission area 71R is illustrated conceptually.

A single left-front light emission area 71L2 formed when the lean angle of the vehicle body 20 is $-\theta2$ is larger than a single left-front light emission area 71L1 formed when the lean angle of the vehicle body 20 is $-\theta1$. A single left-front light emission area 71L3 formed when the lean angle of the vehicle body 20 is $-\theta3$ is larger than the single left-front light emission area 71L2 formed when the lean angle of the vehicle body 20 is $-\theta2$.

The single left-front light emission area 71L2 formed when the lean angle of the vehicle body 20 is $-\theta2$ becomes larger than the single left-front light emission area 71L1 formed when the lean angle of the vehicle body 20 is $-\theta1$, by broadening to extend further in the left-front direction of the vehicle body 20. The single left-front light emission area 71L3 formed when the lean angle of the vehicle body 20 is $-\theta3$ becomes larger than the single left-front light emission area 71L2 formed when the lean angle of the vehicle body 20 is $-\theta2$, by broadening to extend further from the left-front of the vehicle body 20.

That is, the control device 90A causes the quantity of light outputted from the at least one left cornering lamp light source 72L to vary in accordance with the lean angle of the vehicle body 20 such that the single left-front light emission area 71L, which is formed on a road surface at the left-front of the vehicle body 20, becomes larger as the lean angle of the vehicle body 20 increases, by broadening to extend further in the left-front direction of the vehicle body 20, the single left-front light emission area 71L being formed by light that is outputted from the at least one left cornering lamp light source 72L when the leaning vehicle 10A turns left, of which travel direction is then changed by the single left light travel direction changing surface 74L1, and that is then transmitted through the left outer lens 75L.

Especially in the example shown in FIG. 3, the single left-front light emission area 71L2 formed when the lean angle of the vehicle body 20 is −θ2 becomes larger than the single left-front light emission area 71L1 formed when the lean angle of the vehicle body 20 is −θ1, by broadening to extend further in the left-front direction of the vehicle body 20 and also broadening in a direction that is perpendicular to the direction in which the single left-front light emission area 71L extends and that is parallel to the road surface on which the single left-front light emission area 71L is formed. The single left-front light emission area 71L3 formed when the lean angle of the vehicle body 20 is −θ3 becomes larger than the single left-front light emission area 71L2 formed when the lean angle of the vehicle body 20 is −θ2, by broadening to extend further in the left-front direction of the vehicle body 20 and also broadening in a direction that is perpendicular to the direction in which the single left-front light emission area 71L extends and that is parallel to the road surface on which the single left-front light emission area 71L is formed.

That is, the control device 90A causes the quantity of light outputted from the at least one left cornering lamp light source 72L to vary in accordance with the lean angle of the vehicle body 20 such that the single left-front light emission area 71L, which is formed on a road surface at the left-front of the vehicle body 20, becomes larger as the lean angle of the vehicle body 20 increases, by broadening to extend further in the left-front direction of the vehicle body 20 and also broadening to extend in a direction that is perpendicular to the direction in which the single left-front light emission area 71L extends and that is parallel to the road surface on which the single left-front light emission area 71L is formed, the single left-front light emission area 71L being formed by light that is outputted from the at least one left cornering lamp light source 72L when the leaning vehicle 10A turns left, of which travel direction is then changed by the single left light travel direction changing surface 74L1, and that is then transmitted through the left outer lens 75L.

Figure 4:
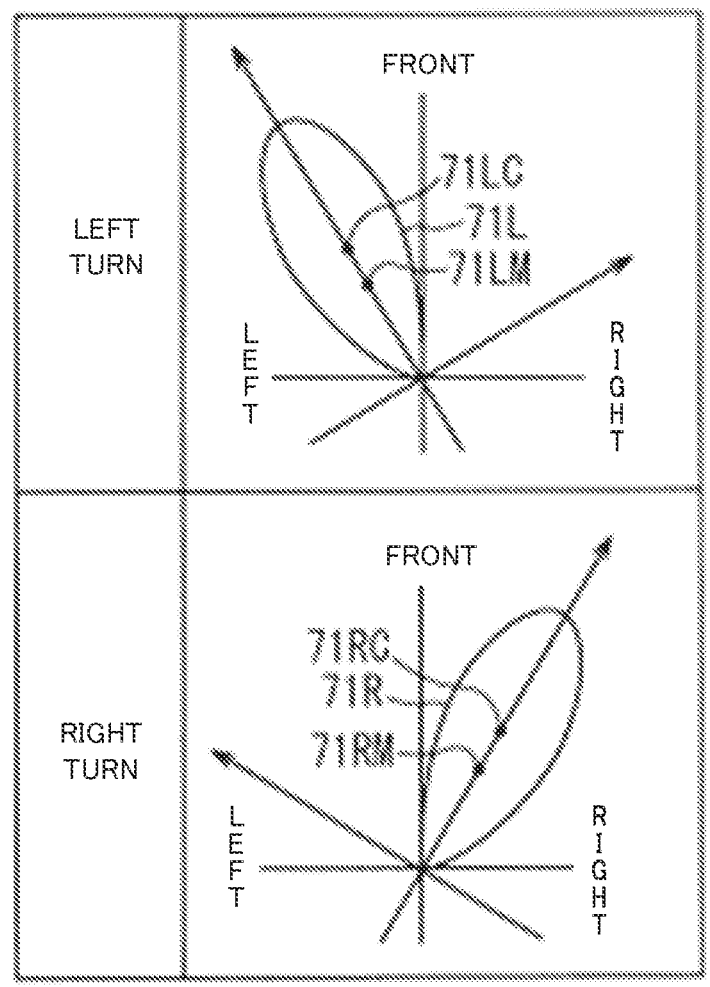
FIG. 4 is an explanatory diagram showing a location having the highest illuminance in the single left-front light emission area and a location having the highest illuminance in the single right-front light emission area, the single left-front light emission area and the single right-front light emission area being formed by light outputted from the light sources of the pair of cornering lamps included in the light emitting device according to the specific example of the embodiment of the present teaching.

Now, referring to FIG. 4, a location 71LM having the highest illuminance in the single left-front light emission area 71L will be described. FIG. 4 is an explanatory diagram showing a location having the highest illuminance in the single left-front light emission area 71L and a location having the highest illuminance in the single right-front light emission area 71R. In FIG. 4, the positional relationship between a location 71LM having the highest illuminance in the single left-front light emission area 71L and a center 71LC of the single left-front light emission area 71L is illustrated conceptually.

The location 71LM having the highest illuminance in the single left-front light emission area 71L is closer to the vehicle body 20 than the center 71LC of the single left-front light emission area 71L is.

Referring to FIG. 2, the control device 90A causes the quantity of light outputted from the at least one right cornering lamp light source 72R to vary in accordance with the lean angle of the vehicle body 20 such that the single right-front light emission area 71R, which is formed on a road surface at the right-front of the vehicle body 20 when the leaning vehicle 10A turns right, becomes larger as the lean angle of the vehicle body 20 increases. Here, an increase in the lean angle of the vehicle body 20 means an increase in the absolute value of the lean angle of the vehicle body 20.

Now, referring to FIG. 3, how the single right-front light emission area 71R becomes larger as the lean angle of the vehicle body 20 increases will be described.

A single right-front light emission area 71R2 formed when the lean angle of the vehicle body 20 is +θ2 is larger than a single right-front light emission area 71R1 formed when the lean angle of the vehicle body 20 is +θ1. A single right-front light emission area 71R3 formed when the lean angle of the vehicle body 20 is +θ3 is larger than the single right-front light emission area 71R2 formed when the lean angle of the vehicle body 20 is +θ2.

The single right-front light emission area 71R2 formed when the lean angle of the vehicle body 20 is +θ2 becomes larger than the single right-front light emission area 71R1 formed when the lean angle of the vehicle body 20 is +θ1, by broadening to extend further in the right-front direction of the vehicle body 20. The single right-front light emission area 71R3 formed when the lean angle of the vehicle body 20 is +θ3 becomes larger than the single right-front light emission area 71R2 formed when the lean angle of the vehicle body 20 is +θ2, by broadening to extend further in the right-front direction of the vehicle body 20.

That is, the control device 90A causes the quantity of light outputted from the at least one right cornering lamp light source 72R to vary in accordance with the lean angle of the vehicle body 20 such that the single right-front light emission area 71R, which is formed on a road surface at the right-front of the vehicle body 20, becomes larger as the lean angle of the vehicle body 20 increases, by broadening to extend further in the right-front direction of the vehicle body 20, the single right-front light emission area 71R being formed by light that is outputted from the at least one right cornering lamp light source 72R when the leaning vehicle 10A turns right, of which travel direction is then changed by the single right light travel direction changing surface 74R1, and that is then transmitted through the right outer lens 75R.

Especially in the example shown in FIG. 3, the single right-front light emission area 71R2 formed when the lean angle of the vehicle body 20 is +θ2 becomes larger than the single right-front light emission area 71R1 formed when the lean angle of the vehicle body 20 is +θ1, by broadening to extend further in the right-front direction of the vehicle body 20 and also broadening in a direction that is perpendicular to the direction in which the single right-front light emission area 71R extends and that is parallel to the road surface on which the single right-front light emission area 71R is formed. The single right-front light emission area 71R3 formed when the lean angle of the vehicle body 20 is +θ3 becomes larger than the single right-front light emission area 71R2 formed when the lean angle of the vehicle body 20 is +θ2, by broadening to extend further in the right-front direction of the vehicle body 20 and also broadening in a direction that is perpendicular to the direction in which the single right-front light emission area 71R extends and that is parallel to the road surface on which the single right-front light emission area 71R is formed.

That is, the control device 90A causes the quantity of light outputted from the at least one right cornering lamp light source 72R to vary in accordance with the lean angle of the vehicle body 20 such that the single right-front light emission area 71R, which is formed on a road surface at the right-front of the vehicle body 20, becomes larger as the lean angle of the vehicle body 20 increases, by broadening to extend further in the right-front direction of the vehicle body 20 and also broadening to extend in a direction that is perpendicular to the direction in which the single right-front light emission area 71R extends and that is parallel to the road surface on which the single right-front light emission area 71R is formed, the single right-front light emission area 71R being formed by light that is outputted from the at least one right cornering lamp light source 72R when the leaning vehicle 10A turns right, of which travel direction is then changed by the single right light travel direction changing surface 74R1, and that is then transmitted through the right outer lens 75R.

Now, referring to FIG. 4, a location 71RM having the highest illuminance in the single right-front light emission area 71R will be described.

The location 71RM having the highest illuminance in the single right-front light emission area 71R is closer to the vehicle body 20 than a center 71RC of the single right-front light emission area 71R is.

The control device 90A is, for example, an ECU (Electric Control Unit). The ECU is implemented by, for example, a combination of an IC (Integrated Circuit), an electronic component, a circuit board, and the like.

Figure 5:
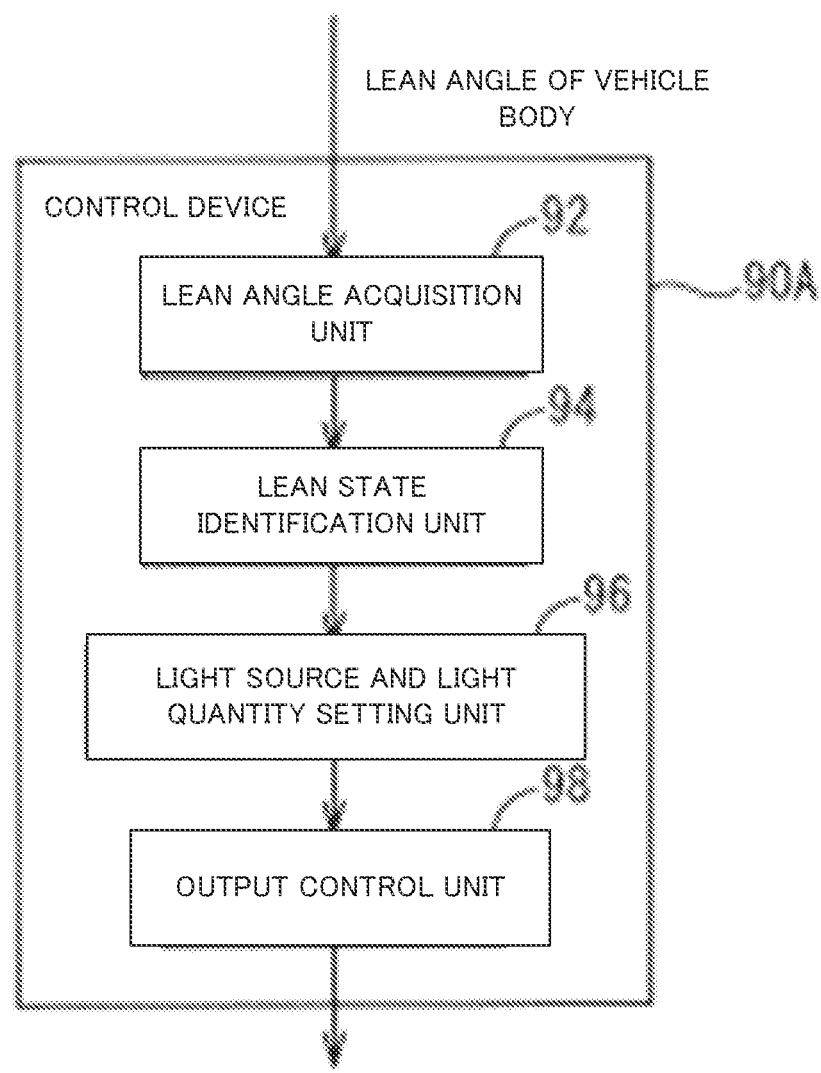
FIG. 5 is a function block diagram showing a control device included in the light emitting device according to the specific example of the embodiment of the present teaching.

Referring to FIG. 5, the control device 90A will be detailed. FIG. 5 is a function block diagram showing the control device 90.

The control device 90A includes a lean angle acquisition unit 92, a lean state identification unit 94, a light source and light quantity setting unit 96, and an output control unit 98. The lean angle acquisition unit 92, the lean state identification unit 94, the light source and light quantity setting unit 96, and the output control unit 98 are each implemented by, for example, a CPU (Central Processing Unit) reading out a program stored in a nonvolatile memory and executing a predetermined process according to the program. Descriptions of them will follow hereinafter.

The lean angle acquisition unit 92 acquires the lean angle of the vehicle body 20 detected by a lean angle detection sensor (not shown). Here, the aspect in which the lean angle acquisition unit 92 acquires the lean angle of the vehicle body 20 detected by the lean angle detection sensor encompasses an aspect in which the lean angle of the vehicle body 20 detected by the lean angle detection sensor is stored in a memory (not shown), for example.

The lean state identification unit 94 identifies the magnitude of the lean angle of the vehicle body 20 and the direction in which the vehicle body 20 is leaning, based on the lean angle of the vehicle body 20 acquired by the lean angle acquisition unit 92. The aspect in which the lean state identification unit 94 identifies the leaning direction of the vehicle body 20 encompasses an aspect in which, for example, the vehicle body 20 is identified as leaning in the left direction 1 if the lean angle of the vehicle body 20 acquired by the lean angle acquisition unit 92 is a lean angle having a negative value while the vehicle body 20 is identified as leaning in the right direction r if the lean angle of the vehicle body 20 acquired by the lean angle acquisition unit 92 is a lean angle having a positive value.

Based on the magnitude of the lean angle of the vehicle body 20 and the direction in which the vehicle body 20 is leaning, which are identified by the lean state identification unit 94, the light source and light quantity setting unit 96 sets: which cornering lamp light source 72 out of the at least one cornering lamp light source 72 included in each of the pair of cornering lamps 70L, 70R is to output light; and the quantity of light outputted from the cornering lamp light source 72 thus set. When the vehicle body 20 is leaning in the left direction 1, the light source and light quantity setting unit 96 makes setting such that the quantity of light outputted from the at least one left cornering lamp light source 72L agrees with the quantity of light corresponding to the magnitude of the lean angle of the vehicle body 20. When the vehicle body 20 is leaning in the right direction r, the light source and light quantity setting unit 96 makes setting such that the quantity of light outputted from the at least one right cornering lamp light source 72R agrees with the quantity of light corresponding to the magnitude of the lean angle of the vehicle body 20.

The output control unit 98 controls light emission by the cornering lamp light source 72 such that: the cornering lamp light source 72 that is set by the light source and light quantity setting unit 96 outputs light; and the quantity of this light agrees with the quantity of light that is set by the light source and light quantity setting unit 96. When the vehicle body 20 is leaning in the left direction 1, the output control unit 98 controls light output by the at least one left cornering lamp light source 72L such that the quantity of light outputted from the at least one left cornering lamp light source 72L agrees with the quantity of light corresponding to the lean angle of the vehicle body 20. When the vehicle body 20 is leaning in the right direction r, the output control unit 98 control light output by the at least one right cornering lamp light source 72R such that the quantity of light outputted from the at least one right cornering lamp light source 72R agrees with the quantity of light corresponding to the lean angle of the vehicle body 20.

Figure 6:
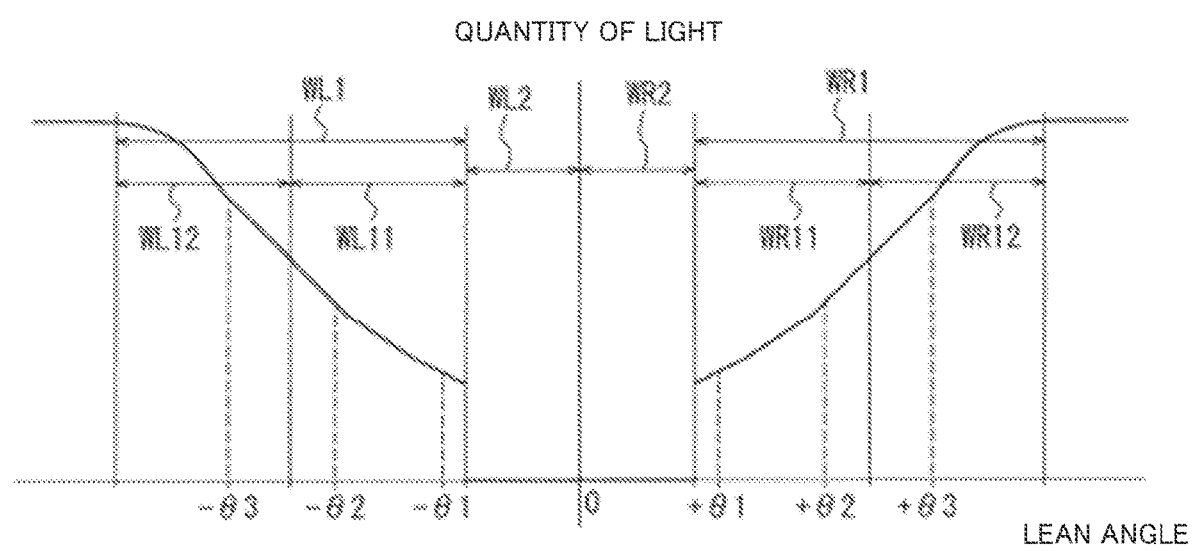
FIG. 6 is a graph showing the relationship between the lean angle of the vehicle body and the quantity of light outputted from the light sources of the pair of cornering lamps included in the light emitting device according to the embodiment of the present teaching.

Referring to FIG. 6, how the light source and light quantity setting unit 96 sets the quantity of light outputted from the at least one cornering lamp 72 will be described. FIG. 6 is a graph showing the relationship between the lean angle of the vehicle body 20 and the quantity of light outputted from the at least one cornering lamp light source 72.

The control device 90A (specifically, the light source and light quantity setting unit 96) controls the quantity of light outputted from the at least one left cornering lamp light source 72L such that the size of the first left lean angle range WL1 becomes equal to the size of the second left lean angle range WL2 or becomes larger than the size of the second left lean angle range WL2.

The size of the first left lean angle range WL1 corresponds to a lean angle range of the vehicle body 20 where the quantity of light outputted from the at least one left cornering lamp light source 72L is increased. The size of the second left lean angle range WL2 corresponds to a lean angle range of the vehicle body 20 in a period from when the vehicle body 20 starts leaning to when the at least one left cornering lamp light source 72L is turned on.

In a case of varying the size of the single left-front light emission area 71L formed on a road surface at the left-front of the vehicle body 20 when the leaning vehicle 10A turns left, the control device 90A (specifically, the light source and light quantity setting unit 96) controls the quantity of light outputted from the at least one left cornering lamp light source 72L such that the quantity of light outputted from the at least one left cornering lamp light source 72L continuously varies in accordance with the lean angle of the vehicle body 20.

It may be also acceptable that, in a case of varying the size of the single left-front light emission area 71L formed on a road surface at the left-front of the vehicle body 20 when the leaning vehicle 10A turns left, the control device 90A (specifically, the light source and light quantity setting unit 96) controls the quantity of light outputted from the at least one left cornering lamp light source 72L such that the quantity of light outputted from the at least one left cornering lamp light source 72L varies at least three times in accordance with the lean angle of the vehicle body 20. The aspect in which the quantity of light outputted from the at least one left cornering lamp light source 72L is varied at least three times in accordance with the lean angle of the vehicle body 20 encompasses an aspect in which, for example, the quantity of light outputted from the at least one left cornering lamp light source 72L is varied stepwise at least three times in accordance with the lean angle of the vehicle body 20.

In a case of varying the size of the single left-front light emission area 71L formed on a road surface at the left-front of the vehicle body 20 when the leaning vehicle 10A turns left, the control device 90A (specifically, the light source and light quantity setting unit 96) controls the quantity of light outputted from the at least one left cornering lamp light source 72L such that the quantity of light outputted from the at least one left cornering lamp light source 72L increases or is maintained as the lean angle of the vehicle body 20 increases, or in other words such that the quantity of light outputted from the at least one left cornering lamp light source 72L is not reduced as the lean angle of the vehicle body 20 increases.

Especially in the example shown in FIG. 6, in a case of varying the size of the single left-front light emission area 71L formed on a road surface at the left-front of the vehicle body 20 when the leaning vehicle 10A turns left, the control device 90A (specifically, the light source and light quantity setting unit 96) controls the quantity of light outputted from the at least one left cornering lamp light source 72L such that the quantity of light outputted from the at least one left cornering lamp light source 72L increases as the lean angle of the vehicle body 20 increases, or in other words such that the quantity of light outputted from the at least one left cornering lamp light source 72L continuously increases as the lean angle of the vehicle body 20 increases, until maximization of the size of the single left-front light emission area 71L formed on the road surface at the left-front of the vehicle body 20 when the leaning vehicle 10A turns left.

In the example shown in FIG. 6, the control device 90A (specifically, the light source and light quantity setting unit 96) controls the quantity of light outputted from the at least one left cornering lamp light source 72L such that the quantity of light outputted from the at least one left cornering lamp light source 72L increases at a higher rate as the lean angle of the vehicle body 20 increases in a second-half range WL12 than in a first-half range WL11, the first-half range WL11 and second-half range WL12 resulting from bisection of the first left lean angle range WL1, which is a lean angle range of the vehicle body where the quantity of light outputted from the at least one left cornering lamp light source 72L is increased as the lean angle of the vehicle body 20 increases.

The control device 90A (specifically, the light source and light quantity setting unit 96) controls the quantity of light outputted from the at least one right cornering lamp light source 72R such that the size of the first right lean angle range WR1 becomes equal to the size of the second right lean angle range WR2 or becomes larger than the size of the second right lean angle range WR2.

The size of the first right lean angle range WR1 corresponds to a lean angle range of the vehicle body 20 where the quantity of light outputted from the at least one cornering lamp light source 72R increases. The size of the second right lean angle range WR2 corresponds to a lean angle range of the vehicle body 20 in a period from when the vehicle body 20 starts leaning to when the at least one cornering lamp light source 72R is turned on.

In a case of varying the size of the single right-front light emission area 71R formed on a road surface at the right-front of the vehicle body 20 when the leaning vehicle 10A turns right, the control device 90A (specifically, the light source and light quantity setting unit 96) controls the quantity of light outputted from the at least one right cornering lamp light source 72R such that the quantity of light outputted from the at least one right cornering lamp light source 72R continuously varies in accordance with the lean angle of the vehicle body 20.

In other words, in a case of varying the size of the single right-front light emission area 71R formed on a road surface at the right-front of the vehicle body 20 when the leaning vehicle 10A turns right, the control device 90A (specifically, the light source and light quantity setting unit 96) controls the quantity of light outputted from the at least one right cornering lamp light source 72R such that the quantity of light outputted from the at least one right cornering lamp light source 72R varies at least three times in accordance with the lean angle of the vehicle body 20.

In a case of varying the size of the single right-front light emission area 71R formed on a road surface at the right-front of the vehicle body 20 when the leaning vehicle 10A turns right, the control device 90A (specifically, the light source and light quantity setting unit 96) controls the quantity of light outputted from the at least one right cornering lamp light source 72R such that the quantity of light outputted from the at least one right cornering lamp light source 72R increases or is maintained as the lean angle of the vehicle body 20 increases.

Especially in the example shown in FIG. 6, in a case of varying the size of the single right-front light emission area 71R formed on a road surface at the right-front of the vehicle body 20 when the leaning vehicle 10A turns right, the control device 90A (specifically, the light source and light quantity setting unit 96) controls the quantity of light outputted from the at least one right cornering lamp light source 72L such that the quantity of light outputted from the at least one right cornering lamp light source 72L increases as the lean angle of the vehicle body 20 increases, until maximization of the size of the single right-front light emission area 71R formed on the road surface at the right-front of the vehicle body 20 when the leaning vehicle 10A turns right.

In the example shown in FIG. 6, the control device 90A (specifically, the light source and light quantity setting unit 96) controls the quantity of light outputted from the at least one right cornering lamp light source 72R such that the quantity of light outputted from the at least one right cornering lamp light source 72R increases at a higher rate as the lean angle of the vehicle body 20 increases in a second-half range WR12 than in a first-half range WR11, the first-half range WR11 and second-half range WR12 resulting from bisection of the first right lean angle range WR1, which is a lean angle range of the vehicle body where the quantity of light outputted from the at least one right cornering lamp light source 72L is increased as the lean angle of the vehicle body 20 increases.

Figure 7:
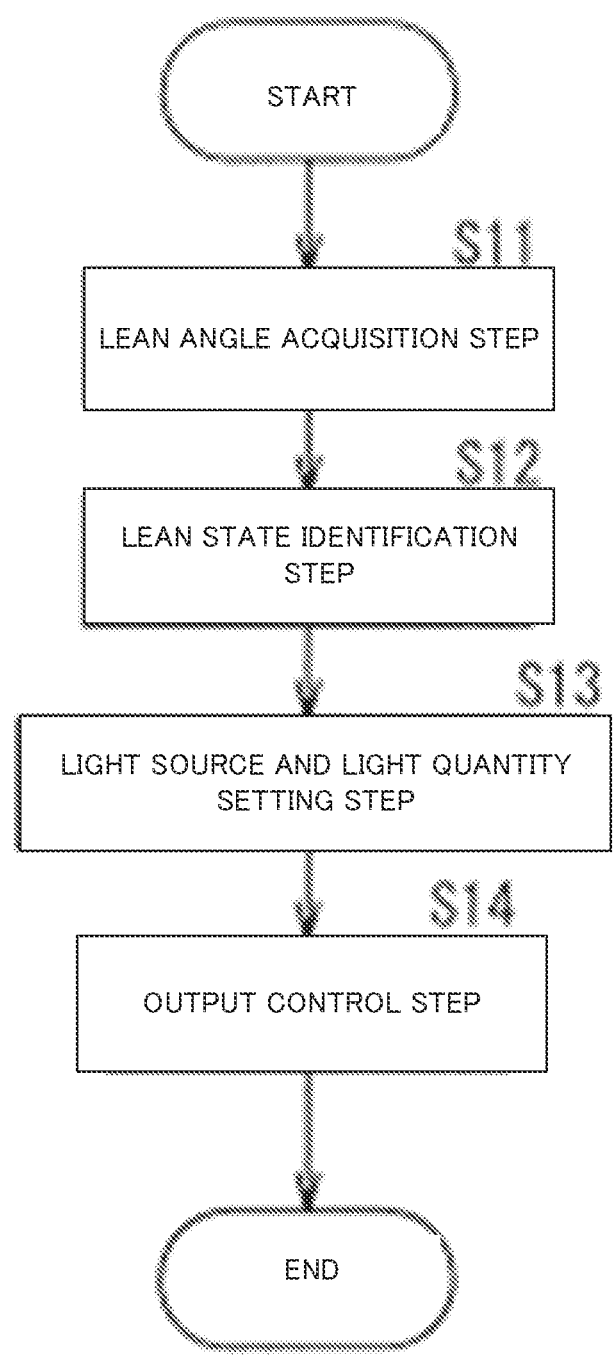
FIG. 7 is a flowchart of a control process that is executed by the control device included in the light emitting device according to the specific example of the embodiment of the present teaching.

Next, referring to FIG. 7, a control process that is executed by the control device 90 will be described. FIG. 7 is a flowchart showing the control process that is executed by the control device 90.

First, in step S11, the control device 90 executes a lean angle acquisition process. The lean angle acquisition process is a process for acquiring a lean angle of the vehicle body 20 detected by the lean angle detection sensor (not shown). The lean angle acquisition process is executed by the lean angle acquisition unit 92. The aspect in which a lean angle of the vehicle body 20 detected by the lean angle detection sensor is acquired encompasses an aspect in which a lean angle of the vehicle body 20 detected by the lean angle detection sensor is stored in a memory (not shown), for example.

Then in step S12, the control device 90 executes a lean state identification process. The lean state identification process is a process for identifying the magnitude of the lean angle of the vehicle body 20 and the direction in which the vehicle body 20 is leaning, based on the lean angle of the vehicle body 20 acquired in the lean angle acquisition process. The lean state identification process is executed by the lean state identification unit 94. The aspect in which the leaning direction of the vehicle body 20 is identified in the lean state identification process encompasses an aspect in which, for example, the vehicle body 20 is identified as leaning in the left direction 1 if the lean angle of the vehicle body 20 acquired in the lean angle acquisition process is a lean angle having a negative value while the vehicle body 20 is identified as leaning in the right direction r if the lean angle of the vehicle body 20 acquired in the lean angle acquisition process is a lean angle having a positive value.

Then in step S13, the control device 90 executes a light source and light quantity setting process. The light source and light quantity setting process is a process for setting: which cornering lamp light source 72 out of the at least one cornering lamp light source 72 included in each of the pair of cornering lamps 70L, 70R is to output light; and the quantity of light outputted from the cornering lamp light source 72 thus set, the setting being made based on the magnitude of the lean angle of the vehicle body 20 and the direction in which the vehicle body 20 is leaning that are identified in the lean state identification process. The light source and light quantity setting process is executed by the light source and light quantity setting unit 96. In the light source and light quantity setting process, when the vehicle body 20 is leaning in the left direction 1, setting is made such that the quantity of light outputted from the at least one left cornering lamp light source 72L agrees with the quantity of light corresponding to the magnitude of the lean angle of the vehicle body 20. In the light source and light quantity setting process, when the vehicle body 20 is leaning in the right direction r, setting is made such that the quantity of light outputted from the at least one right cornering lamp light source 72R agrees with the quantity of light corresponding to the magnitude of the lean angle of the vehicle body 20.

Then in step S14, the control device 90 executes an output control process. The output control process is a process for controlling light emission by the cornering lamp light source 72 such that: the cornering lamp light source 72 that is set in the light source and light quantity setting process outputs light; and the quantity of this light agrees with the quantity of light that is set in the light source and light quantity setting process. The output control process is executed by the output control unit 98. In the output control process, when the vehicle body 20 is leaning in the left direction 1, light output by the at least one left cornering lamp light source 72L is controlled such that the quantity of light outputted from the at least one left cornering lamp light source 72L agrees with the quantity of light corresponding to the lean angle of the vehicle body 20. In the output control process, when the vehicle body 20 is leaning in the right direction r, light output by the at least one right cornering lamp light source 72R is controlled such that the quantity of light outputted from the at least one right cornering lamp light source 72R agrees with the quantity of light corresponding to the lean angle of the vehicle body 20.

The leaning vehicle 10A thus far described includes the headlamp device 50A. Accordingly, like in the embodiment described above, occurrence of bright/dark contrast in a light emission area can be suppressed while the light emission area becomes larger, the light emission area being formed on a road surface at the left-front or right-front of the vehicle body 20 when the leaning vehicle 10A turns.

OTHER EMBODIMENTS

The embodiments and variations described and/or illustrated herein are for facilitating understanding of the present disclosure, and do not limit the concept of the present disclosure. The foregoing embodiments and variations can be changed or modified without departing from the gist thereof.

The gist encompasses equivalent elements, corrections, deletions, combinations (for example, combinations of features across embodiments and variations), improvements, and/or changes that can be recognized by those skilled in the art based on the embodiments disclosed herein. The limitations of the appended claims should be broadly interpreted based on terms used in the appended claims, and should not be limited by the embodiments and variations described herein or in the prosecution of the present application. The embodiments and variations should be construed as non-exclusive. For example, the terms "preferably" and "may" as used herein are non-exclusive, respectively meaning "preferable, but not limited to this" and "may be, but not limited to this".

The specific example of the embodiment described above may be configured such that the left cornering lamp 70L forms the single left-front light emission area 71L when the leaning vehicle 10A turns left while the right cornering lamp 70R forms the single right-front light emission area 71R when the leaning vehicle 10A turns right.

The specific example of the embodiment described above may be configured such that the pair of cornering lamps 70L, 70R and the headlamp 60 each include a housing. In such a configuration, housings of the pair of cornering lamps 70L, 70R may be the same as a housing of the headlamp 60, or may be different from the housing of the headlamp 60.

The specific example of the embodiment described above may be configured such that the left cornering lamp 70L and the right cornering lamp 70R each include a housing. A housing of the left cornering lamp 70L may be formed as a member separate from a housing of the right cornering lamp 70R. The housing of the left cornering lamp 70L may be formed as a member integral with the housing of the right cornering lamp 70R. In other words, the left cornering lamp 70L and the right cornering lamp 70R may include a common housing.

The specific example of the embodiment described above may be configured such that the left outer lens 75L is formed as a member integral with the right outer lens 75R, or formed as a member separate from the right outer lens 75R.

DESCRIPTION OF THE REFERENCE SIGNS 10 leaning vehicle
20 vehicle body
50 light emitting device
70L, 70R pair of cornering lamps
71L single left-front light emission area
71R single right-front light emission area
72 cornering lamp light source
74 light travel direction changing member
741 single light travel direction changing surface

The invention claimed is:

1. A light emitting device for use in a leaning vehicle including a vehicle body that leans in a left direction in turning left and leans in a right direction in turning right, the light emitting device being supported by the vehicle body so that the light emitting device leans in the left direction together with the vehicle body in turning left and leans in the right direction together with the vehicle body in turning right, the light emitting device comprising:
 a pair of cornering lamps, including a first cornering lamp and a second cornering lamp, that emit light to form
  a single left-front light emission area visually recognizable by a rider of the leaning vehicle on a road surface at left-front of the vehicle body when the leaning vehicle turns left, and
  a single right-front light emission area visually recognizable by the rider of the leaning vehicle on the road surface at right-front of the vehicle body when the leaning vehicle turns right; and
 a control device that controls light emission by the pair of cornering lamps based on a lean angle of the vehicle body, wherein
 each of the pair of cornering lamps includes:
  at least one light source, and
  a light travel direction changing member disposed corresponding to the at least one light source, the light travel direction changing member changing a travel direction of light outputted from the at least one light source; and
 the control device is configured
  to cause a first quantity of light, which is a quantity of light outputted from the at least one light source included in the first cornering lamp, to vary in accordance with the lean angle of the vehicle body, such that
   the single left-front light emission area becomes larger as the lean angle of the vehicle body increases, and
   the first quantity of light is increased as the lean angle of the vehicle body increases within a first left lean angle range, the first left lean angle range being equal to or larger than a second left lean angle range that is a range of the lean angle of the vehicle body between when the vehicle body starts leaning left and when the at least one light source included in the first cornering lamp is turned on, and
  to cause a second quantity of light, which is a quantity of light outputted from the at least one light source included in the second cornering lamp, to vary in accordance with the lean angle of the vehicle body, such that
   the single right-front light emission area becomes larger as the lean angle of the vehicle body increases, and
   the second quantity of light is increased as the lean angle of the vehicle body increases within a first right lean angle range, the first right lean angle range being equal to or larger than a second right lean angle range that is a range of the lean angle of the vehicle body between when the vehicle body starts leaning right and when the at least one light source included in the second cornering lamp is turned on.

2. He light emitting device according to claim 1, wherein the light travel direction changing member is any one of the following (1) to (3):
 (1) a reflector including a single reflector surface for reflecting light outputted from the at least one light source;
 (2) a light guide member on which light from the at least one light source is incident, the light guide member being configured to cause the light incident thereon to be totally reflected therein, to output the resulting light in the front direction of the leaning vehicle; and
 (3) a lens on which light from the at least one light source is directly incident, the lens being configured to refract the light directly incident thereon.

3. He light emitting device according to claim 1, wherein
 a location having a highest illuminance in the single left-front light emission area is closer to the vehicle body than a center of the single left-front light emission area is, and
 a location having a highest illuminance in the single right-front light emission area is closer to the vehicle body than a center of the single right-front light emission area is.

4. He light emitting device according to claim 1, wherein the control device is configured
 to adjust the first quantity of light to broaden the single left-front light emission area, to thereby extend the single left-front light emission area in a left-front direction of the vehicle body, as the lean angle of the vehicle body increases; and
 to adjust the second quantity of light to broaden the single right-front light emission area, to thereby extend the single right-front light emission area in a right-front direction of the vehicle body, as the lean angle of the vehicle body increases.

5. He light emitting device according to claim 4, wherein the control device is configured
 to adjust the first quantity of light to broaden the single left-front light emission area, to extend the single left-front light emission area both in the left-front direction of the vehicle body and in a direction that is perpendicular to the left-front direction and is parallel to the road surface, as the lean angle of the vehicle body increases; and
 to adjust the second quantity of light to broaden the single right-front light emission area, to extend the single right-front light emission area both in the right-front direction of the vehicle body and in a direction that is perpendicular to the right-front direction and is parallel to the road surface, as the lean angle of the vehicle body increases.

6. He light emitting device according to claim 1, wherein the control device causes each of the first quantity of light and the second quantity of light to continuously vary in accordance with the lean angle of the vehicle body.

7. He light emitting device according to claim 1, wherein the control device causes each of the first quantity of light and the second quantity of light to vary at least three times in accordance with the lean angle of the vehicle body.

8. He light emitting device according to claim 1, wherein the control device causes each of the first quantity of light and the second quantity of light to increase or to be maintained as the lean angle of the vehicle body increases.

9. He light emitting device according to claim 8, wherein the control device causes the first quantity of light and the second quantity of light to increase as the lean angle of the vehicle body increases, until a size of the single left-front light emission area and a size of the single right-front light emission area are respectively maximized.

10. He light emitting device according to claim 9, wherein the control device causes the first quantity of light and the second quantity of light to increase at a higher rate as the lean angle of the vehicle body increases in a second-half range than in a first-half range of the first left lean angle range and of the first right lean angle range, respectively.

11. He light emitting device according to claim 1, wherein the first cornering lamp and the second cornering lamp are arranged side by side in a left-right direction of the vehicle body.

12. A leaning vehicle comprising:
a vehicle body that leans in a left direction in turning left, and leans in a right direction in turning right; and
a light emitting device of claim 1, supported by the vehicle body so that the light emitting device leans in the left direction together with the vehicle body in turning left and leans in the right direction together with the vehicle body in turning right.

* * * * *